US012134174B2

(12) United States Patent
Fujisawa

(10) Patent No.: US 12,134,174 B2
(45) Date of Patent: Nov. 5, 2024

(54) DRIVING DEVICE

(71) Applicant: Koki Holdings Co., Ltd., Tokyo (JP)

(72) Inventor: Kohei Fujisawa, Ibaraki (JP)

(73) Assignee: KOKI HOLDINGS CO., LTD., Tokyo (JP)

( * ) Notice: Subject to any disclaimer, the term of this patent is extended or adjusted under 35 U.S.C. 154(b) by 168 days.

(21) Appl. No.: 17/780,674

(22) PCT Filed: Oct. 30, 2020

(86) PCT No.: PCT/JP2020/040882

§ 371 (c)(1),
(2) Date: May 27, 2022

(87) PCT Pub. No.: WO2021/106495

PCT Pub. Date: Jun. 3, 2021

(65) Prior Publication Data

US 2023/0010405 A1 Jan. 12, 2023

(30) Foreign Application Priority Data

Nov. 28, 2019 (JP) ................................. 2019-215115

(51) Int. Cl.
*B25C 1/04* (2006.01)

(52) U.S. Cl.
CPC .............. *B25C 1/047* (2013.01); *B25C 1/046* (2013.01)

(58) Field of Classification Search
CPC .......... B25C 1/045; B25C 1/047; B25C 1/046
See application file for complete search history.

(56) References Cited

U.S. PATENT DOCUMENTS 3,170,487 A 2/1965 Juilfs et al.
5,878,936 A * 3/1999 Adachi .................. B25C 1/041 227/130
2008/0011806 A1* 1/2008 Kitagawa ................ B25C 1/008 227/8

FOREIGN PATENT DOCUMENTS

JP S61-117074 A 6/1986
JP S63-017373 U 2/1988
JP H04-106576 U 9/1992
JP H07-002742 U 1/1995
JP H09-001475 A 1/1997

(Continued)

OTHER PUBLICATIONS

International Search Report issued in corresponding International Application No. PCT/JP2020/040882, dated Dec. 2, 2020 w/English Translation (8 pages).

*Primary Examiner* — Thomas M Wittenschlaeger
(74) *Attorney, Agent, or Firm* — Rimon P.C.

(57) ABSTRACT

A driving device includes an operable striking unit, a piston upper chamber configured to operate the striking unit by gas pressure, a housing, a head cap provided in the housing, a passage provided in the head cap, and an exhaust valve operably provided in the housing and configured to open and close the passage. The exhaust valve includes a contact portion and a non-contact portion, the contact portion comes into and out of contact with the head cap on an outer side of the passage in a radial direction of the passage, the non-contact portion is provided on an inner side of the contact portion in the radial direction of the passage, and the non-contact portion is provided at a position separated from the head cap in a state where die contact portion is in contact with the head cap.

12 Claims, 15 Drawing Sheets

(56) References Cited

FOREIGN PATENT DOCUMENTS

| | | | |
|---|---|---|---|
| JP | H09-300237 | A | 11/1997 |
| JP | 2008-018484 | A | 1/2008 |
| WO | 2019/171809 | A1 | 9/2019 |

* cited by examiner

10: DRIVING DEVICE
11: HOUSING
13: STRIKING UNIT
27: HEAD CAP
30: EXHAUST VALVE
32: PISTON UPPER CHAMBER
80: CONTACT PORTION
100: NON-CONTACT PORTION
B1: OUTSIDE (A)

(B)

(A)

(B)

(A)

(B)

DRIVING DEVICE

CROSS REFERENCE TO RELATED APPLICATIONS

This application is the U.S. National Phase under 35 U.S.C. § 371 of International Application No. PCT/JP2020/040882, filed on Oct. 30, 2020, which claims the benefit of Japanese Application No. 2019-215115, filed on Nov. 28, 2019, the entire contents of each are hereby incorporated by reference.

TECHNICAL FIELD

The present invention relates to a driving device having a striking unit operated by gas pressure.

BACKGROUND ART

Patent Document 1 describes an example of a driving device having a striking unit operated by gas pressure. The driving device described in Patent Document 1 includes a housing, a driver as a striking unit, a first pressure chamber, a valve seat, a passage provided in the valve seat, an exhaust valve as a valve body, an exhaust valve chamber, an accumulator chamber, a cylinder, a head cap, a valve, an ejection unit, a trigger, a push lever, and a magazine. The driver can operate with respect to the housing. The cylinder can operate within the housing. The first pressure chamber is provided in the housing and operates the driver by the pressure of air as the gas. The head cap and the valve seat are fixedly provided in the housing. The exhaust valve is operably provided in the housing. The exhaust valve chamber is provided in the housing. Compressed air is supplied to the accumulator chamber. The ejection unit is attached to the housing. The magazine is attached to the ejection unit, and fasteners in the magazine are sent to the ejection unit.

In the driving device described in Patent Document 1, when the user is stopping the trigger and the push lever, the valve disconnects the accumulator chamber and the exhaust valve chamber, and connects the exhaust valve chamber and the outside of the housing. Therefore, the exhaust valve is separated from the valve seat and opens the passage. Further, the cylinder is stopped in contact with the head cap. Accordingly, no air is supplied from the accumulator chamber to the first pressure chamber, and the driver is stopped at the top dead center.

On the other hand, when the user operates the trigger and the push lever, the valve connects the accumulator chamber and the exhaust valve chamber, and disconnects the exhaust valve chamber and the outside of the housing. Then, the air in the accumulator chamber is supplied to the exhaust valve chamber, and the exhaust valve operates and is pressed to the valve seat. Namely, the exhaust valve closes the passage. Therefore, the cylinder is operated by the air pressure of the accumulator chamber, and the cylinder is separated from the head cap. As a result, the air in the accumulator chamber is supplied to the first pressure chamber, the driver operates from the top dead center to the bottom dead center, and the driver strikes the fastener.

RELATED ART DOCUMENTS

Patent Documents

Patent Document 1: Japanese Unexamined Patent Application Publication No. 2008-18484

SUMMARY OF THE INVENTION

Problem to be Solved by the Invention

The inventor of this application recognized the problem that when the operation in which the valve body was brought into and out of contact with the valve seat was repeated, the strength of the valve body decreased and the function of the valve body to close the passage was deteriorated.

An object of the present invention is to provide a driving device capable of suppressing the decrease in strength of the valve body when the operation in which the valve body is brought into and out of contact with the valve seat is repeated.

Means for Solving the Problems

A driving device according to an embodiment includes an operable striking unit, a first pressure chamber configured to operate the striking unit by gas pressure, a housing in which the striking unit and the first pressure chamber are provided, a valve seat fixed in the housing, a passage provided in the valve seat and connecting the first pressure chamber and an outside of the housing, and a valve body operably provided in the housing and configured to open and close the passage by coming into and out of contact with the valve seat. The valve body includes a contact portion and a non-contact portion arranged outside the first pressure chamber, the contact portion opens and closes the passage by coming into and out of contact with the valve seat on an outer side of the passage in a radial direction of the passage in a first direction intersecting an operation direction of the valve body, the non-contact portion is provided on an inner side of the contact portion in the radial direction of the passage in the first direction, and the non-contact portion is provided at a position separated from the valve seat in the operation direction of the valve body in a state where the contact portion is in contact with the valve seat in a second direction which is the operation direction of the valve body.

Effects of the Invention

In the driving device according to the embodiment, it is possible to suppress the decrease in strength of the valve body when the operation in which the valve body is brought into and out of contact with the valve seat is repeated. Therefore, the function of the valve body to close the passage can be maintained.

DETAILED DESCRIPTION OF PREFERRED EMBODIMENTS

Next, a driving device of a typical embodiment among some embodiments included in the driving device according to the present invention will be described with reference to drawings.

Figure 1:
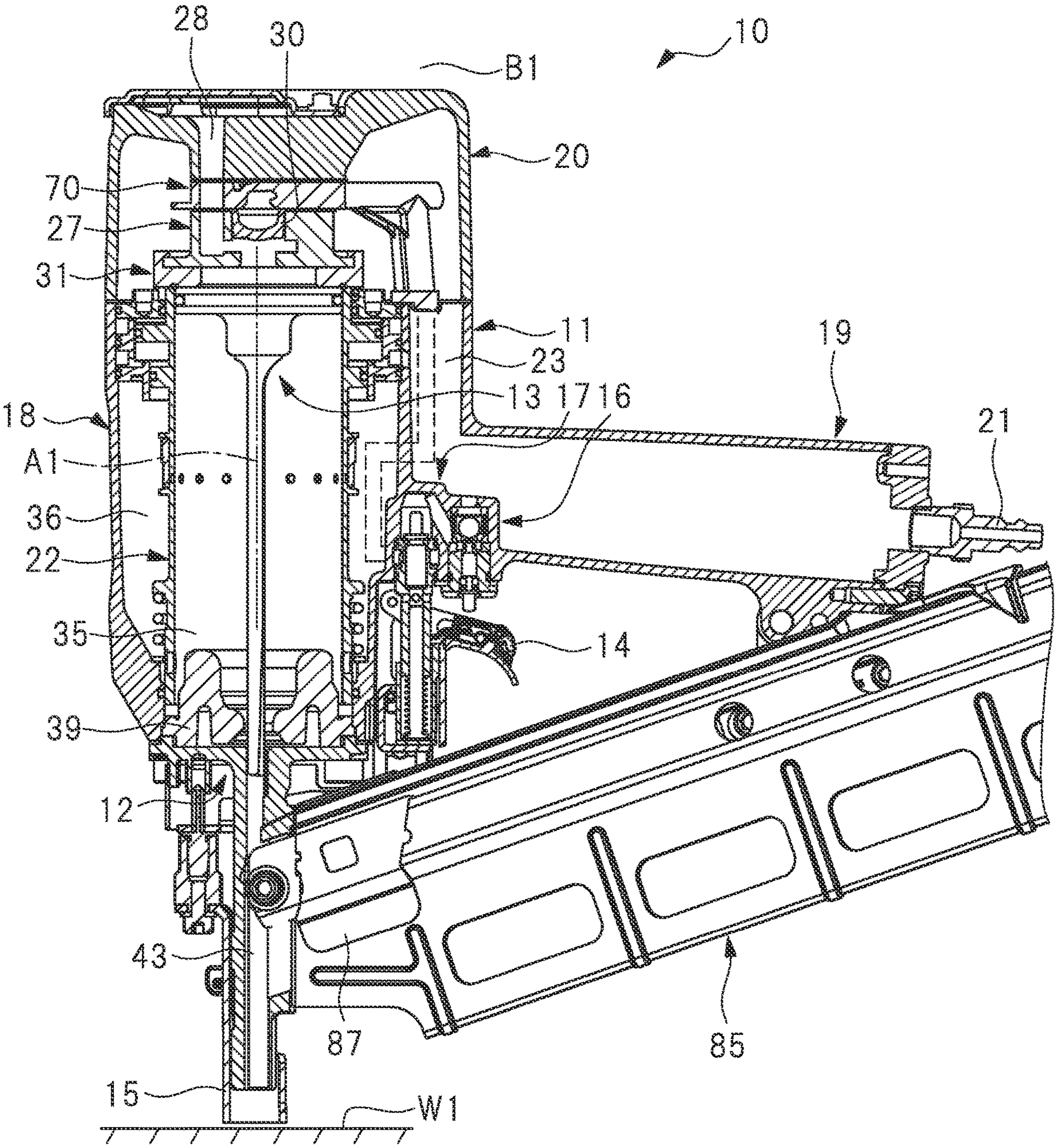
FIG. 1 is a side cross-sectional view showing an overall structure of the driving device according to an embodiment of the present invention.

The driving device 10 shown in FIG. 1 includes a housing 11, an ejection unit 12, a striking unit 13, a trigger 14, a push lever 15, a trigger valve 16, and a push lever valve 17. The housing 11 has a body portion 18, a handle 19, and a head cover 20. The body portion 18 has a tubular shape, and the handle 19 is connected to the body portion 18. The head cover 20 is fixed to a first end portion of the body portion 18 in the longitudinal direction, and the head cover 20 closes the opening of the body portion 18. Further, the ejection unit 12 is fixed to a second end portion of the body portion 18 in the longitudinal direction. A plug 21 is provided on the handle 19 and an air hose is connected to the plug 21.

A cylinder 22 is provided in the body portion 18. The cylinder 22 can move in the direction along the center line A1 with respect to the housing 11. The center line A1 is the center line of the cylinder 22. The striking unit 13 is arranged across the inside and outside of the cylinder 22. The striking unit 13 can operate in the direction along the center line A1 with respect to the cylinder 22. An accumulator chamber 23 is provided across the inside of the handle 19, the inside of the body portion 18, and the inside of the head cover 20. The compressed air supplied from the air hose is stored in the accumulator chamber 23.

A base 70, a head cap 27, and a valve seat 31 are arranged in the head cover 20. The base 70 is fixed to the head cover 20, the head cap 27 is fixed to the base 70, and the valve seat 31 is fixed to the head cap 27. The head cap 27 is made of metal, for example, steel or an aluminum alloy. An exhaust passage 28 is provided across the head cover 20, the base 70, and the head cap 27. The exhaust passage 28 is connected to the outside B1 of the housing 11.

The base 70 has an exhaust valve chamber 26, and the exhaust valve chamber 26 is connected to a passage 25. The head cap 27 has a guide hole 71, and the exhaust valve 30 is arranged in the guide hole 71. The exhaust valve 30 can move in the direction along the center line A1 with respect to the head cap 27. The valve seat 31 is made of synthetic rubber, and the valve seat 31 has a piston upper chamber 32 and a passage 29. The passage 29 is a hole through which compressed air can pass. The piston upper chamber 32 is connected to the passage 29. The exhaust valve 30 is arranged outside the passage 29 and the piston upper chamber 32.

The striking unit 13 has a piston 33 and a driver blade 34. The piston 33 and the driver blade 34 may be integrally molded or the piston 33 and the driver blade 34 may be different components fixed to each other. The piston 33 is provided in the cylinder 22, and the piston 33 can operate in the direction along the center line A1 with respect to the cylinder 22. The piston 33 is biased in the direction away from the valve seat 31 along the center line A1 by the pressure of the piston upper chamber 32. A sealing member 97 is attached to the outer peripheral surface of the piston 33. The sealing member 97 comes into contact with the inner peripheral surface of the cylinder 22.

Figure 2:
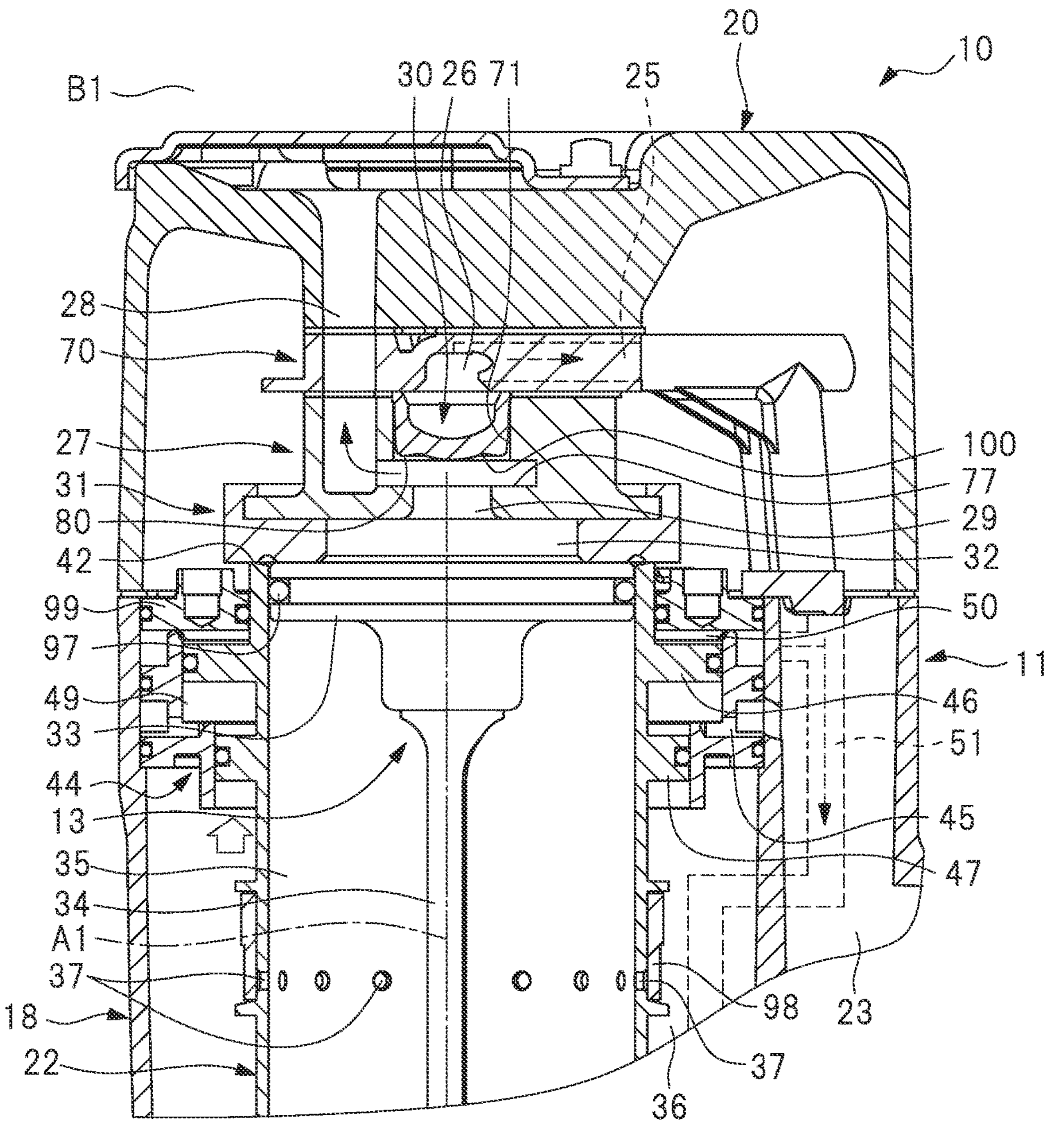
FIG. 2 is a partial cross-sectional view showing a state of the driving device in which the exhaust valve is separated from the head cap and is stopped and the cylinder is stopped in contact with the stopper.

As shown in FIG. 1, a piston lower chamber 35 is provided between the piston 33 and the ejection unit 12 in the direction along the center line A1 in the cylinder 22. The sealing member 97 separates the piston upper chamber 32 and the piston lower chamber 35. A return air chamber 36 is provided between the body portion 18 and the cylinder 22. Passages 37 and 38 that penetrate the cylinder 22 in the radial direction are provided. As shown in FIG. 2, a check valve 98 is attached to the outer periphery of the cylinder 22. The check valve 98 operates by the pressure in the cylinder 22 and opens and closes the passage 37. The passage 38 shown in FIG. 3 always connects the piston lower chamber 35 and the return air chamber 36. The passage 38 is arranged between the passage 37 and the ejection unit 12 in the direction along the center line A1.

Figure 3:
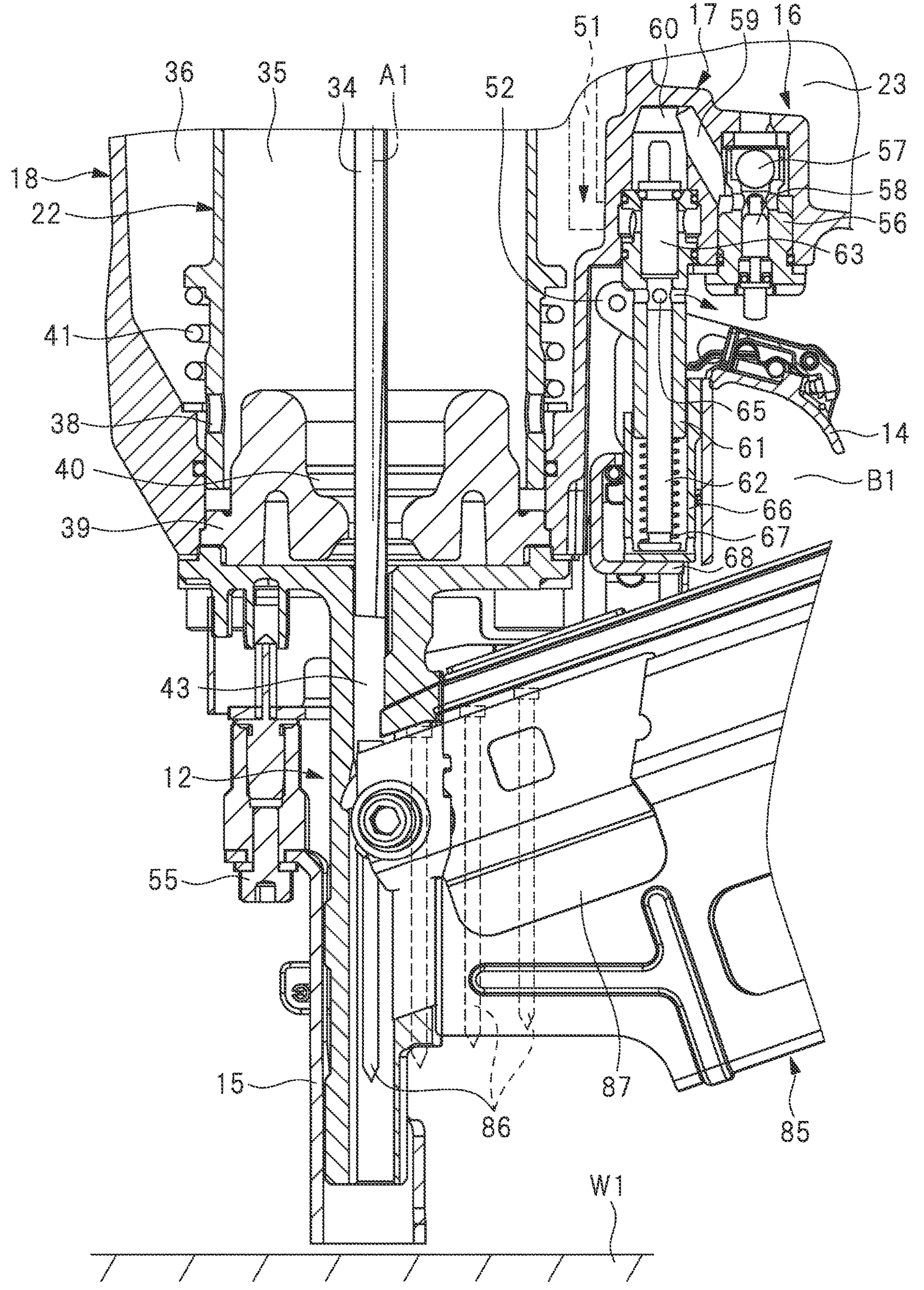
FIG. 3 is a partial cross-sectional view showing a state of the driving device in which the push lever is separated from an object and an operation force to the trigger is released.

Further, a bumper 39 shown in FIG. 3 is provided in the body portion 18. A part of the bumper 39 is arranged in the cylinder 22 and is in contact with the ejection unit 12. The bumper 39 is made of synthetic rubber. The bumper 39 has a shaft hole 40.

Further, as shown in FIG. 3, a spring 41 as a biasing member is provided in the body portion 18. The spring 41 biases the cylinder 22 toward the valve seat 31 in the direction along the center line A1. A passage 42 is formed between an end portion of the cylinder 22 and the valve seat 31. The ejection unit 12 is fixed to the body portion 18. As shown in FIG. 3, the ejection unit 12 has an ejection path 43. The ejection path 43 is connected to the shaft hole 40. The driver blade 34 can operate in the shaft hole 40 and the ejection path 43 in the direction along the center line A1.

As shown in FIG. 2, a holder 44 is provided inside the body portion 18. The holder 44 has an annular shape, and the holder 44 is arranged outside the cylinder 22 in the radial direction of the cylinder 22. The holder 44 has a passage 45, and the passage 45 is connected to the accumulator chamber 23. Flanges 46 and 47 are provided on the outer peripheral surface of the cylinder 22. A control chamber 49 is provided between the flange 46 and the flange 47. The control chamber 49 is connected to the accumulator chamber 23 by the passage 45.

A partition wall 99 that separates the inside of the head cover 20 from the inside of the body portion 18 is provided. A control chamber 50 is formed between the partition wall 99 and the flange 46. The body portion 18 has a passage 51, and the control chamber 50 is connected to the passage 51. The passage 51 is connected to the passage 25. The flange 46 receives the pressure of the control chambers 49 and 50, and the flange 47 receives the pressure of the control chamber 49. The cylinder 22 is biased in the direction along the center line A1 by the pressure of the control chambers 49 and 50 and the biasing force of the spring 41.

The trigger 14 is attached to the housing 11 as shown in FIG. 3. The trigger 14 can operate within a range of a predetermined angle about a support shaft 52. A spring is attached to the support shaft 52, and the spring biases the trigger 14 clockwise about the support shaft 52. When the worker grips the handle 19 by hand and applies an operation force to the trigger 14 with a finger, the trigger 14 can operate counterclockwise against the biasing force of the spring. When the worker releases the biasing force on the trigger 14, the trigger 14 operates clockwise by the biasing force of the spring.

The push lever 15 is attached to the ejection unit 12 as shown in FIG. 3. The push lever 15 can operate in the direction along the center line A1 with respect to the housing 11 and the ejection unit 12. The push lever 15 is biased by a spring in the direction away from the housing 11. The push lever 15 biased by the spring comes into contact with the stopper 55 and stops at the initial position. When the tip of the push lever 15 is pressed to an object W1, the push lever 15 can operate in the direction toward the housing 11 against the biasing force of the spring.

The structure of the trigger valve 16 and the push lever valve 17 is shown in FIG. 3. The trigger valve 16 has a tubular guide portion 56, a ball-shaped valve member 57, a plunger 58, and a passage 59. The guide portion 56 is attached to the housing 11. The plunger 58 can operate with respect to the guide portion 56. When the operation force on the trigger 14 is released, the trigger 14 is separated from the plunger 58, and the trigger valve 16 is in the initial state. The trigger valve 16 in the initial state disconnects the accumulator chamber 23 and the passage 59, and connects the passage 59 and the outside B1.

Figure 5:
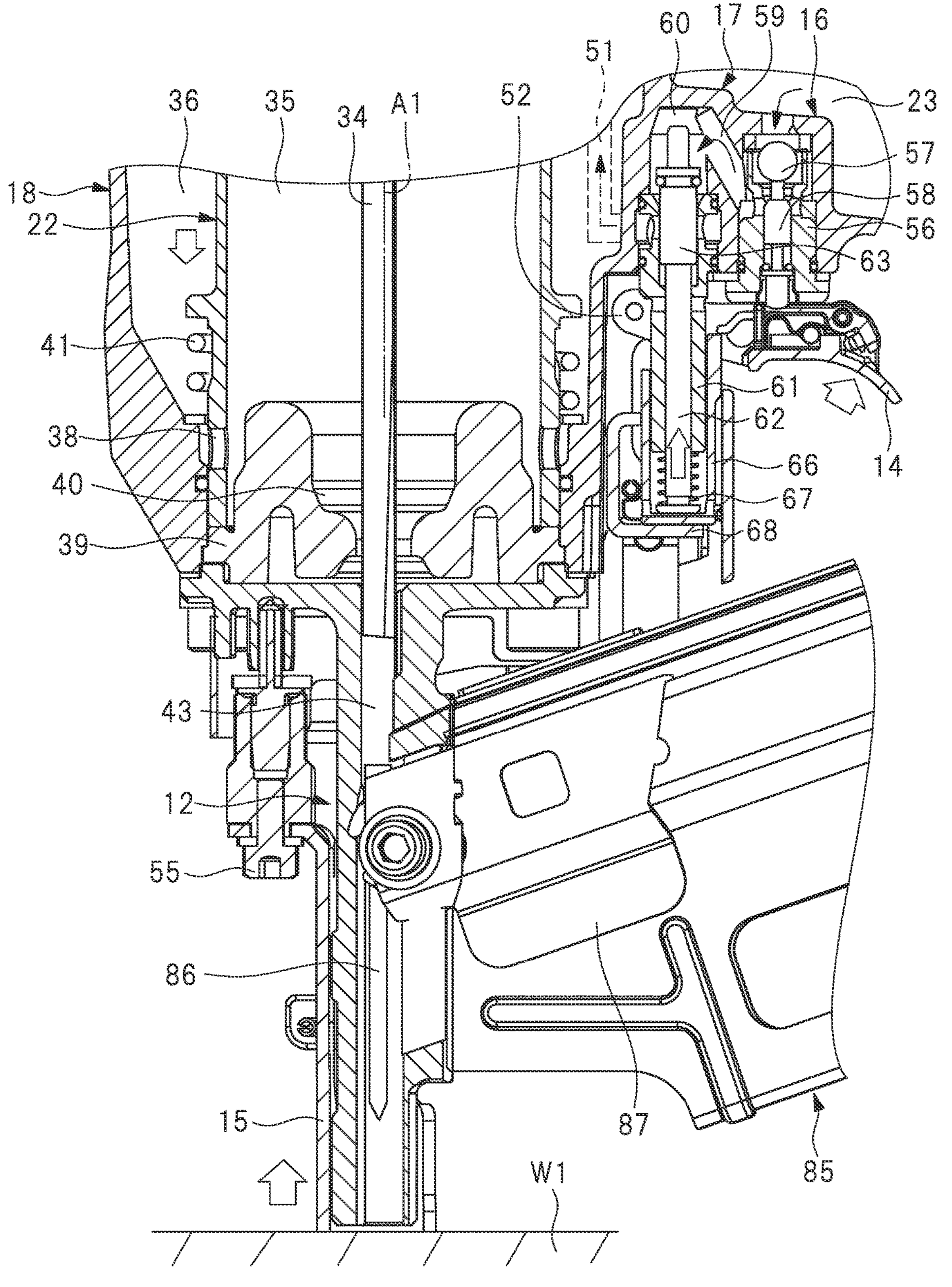
FIG. 5 is a partial cross-sectional view showing a state of the driving device in which the push lever is in contact with an object and an operation force is applied to the trigger.

As shown in FIG. 5, when the operation force is applied to the trigger 14 and the plunger 58 is operated, the trigger valve 16 switches from the initial state to the operating state. The trigger valve 16 in the operating state connects the accumulator chamber 23 and the passage 59, and disconnects the passage 59 and the outside B1. Therefore, the compressed air in the accumulator chamber 23 flows into the passage 59.

The push lever valve 17 has a pressure chamber 60, a valve body 61, a plunger 62, a valve member 63, and a spring. The pressure chamber 60 is connected to the passage 59. The valve body 61 is attached to the housing 11, and the plunger 62 and the valve member 63 can operate with respect to the valve body 61, respectively. The valve body 61 has an exhaust passage 65. The spring biases the valve member 63 in the direction toward the plunger 62.

Further, a transmission member 66 is provided, and the transmission member 66 can operate with respect to the valve body 61. The transmission member 66 has a tubular shape, and a part of the valve body 61 is arranged inside the transmission member 66. A spring 67 is provided in the transmission member 66. The spring 67 biases the plunger 62 in the direction away from the valve member 63. Further, the push lever 15 has an arm 68, and the arm 68 and the transmission member 66 are connected so as to be able to transmit power.

When the push lever 15 is separated from the object W1, the push lever 15 is stopped at the initial position. The operation force is not transmitted from the push lever 15 to the transmission member 66, and the transmission member 66 is stopped at the initial position. Further, the push lever valve 17 is in the initial state shown in FIG. 3. When the push lever valve 17 is in the initial state, the plunger 62 is stopped at the initial position and the exhaust passage 65 is opened. Further, the valve member 63 disconnects the pressure chamber 60 and the passage 51.

On the other hand, when the worker presses the push lever 15 to the object W1 and the push lever 15 is operated, the operation force of the push lever 15 is transmitted to the transmission member 66 by the arm 68, and the transmission member 66 operates in the direction toward the valve member 63 from the initial position. Then, the push lever valve 17 switches from the initial state to the operating state shown in FIG. 5. When the push lever valve 17 is in the operating state, the plunger 62 disconnects the exhaust passage 65, and the valve member 63 operates by the operation force of the plunger 62 against the biasing force of the spring, so that the pressure chamber 60 and the passage 51 are connected.

The magazine 85 shown in FIG. 1 and FIG. 3 is attached to the driving device 10. The magazine 85 contains nails 86. The magazine 85 is supported by the ejection unit 12 and the handle 19. A feeder 87 is provided in the magazine 85, and the feeder 87 sends the nails 86 to the ejection path 43.

An example of using the driving device 10 will be described. When the worker releases the operation force on the trigger 14 and separates the push lever 15 from the object W1 as shown in FIG. 3, the trigger valve 16 is in the initial state and the push lever valve 17 is in the initial state. Namely, the trigger valve 16 disconnects the accumulator chamber 23 and the passage 59. Further, the push lever valve 17 disconnects the pressure chamber 60 and the passage 51, and connects the passage 51 and the exhaust passage 65.

The exhaust valve chamber 26 is connected to the outside B1 of the housing 11 via the passages 25 and 51 and the exhaust passage 65. Therefore, the exhaust valve 30 is stopped at the initial position in contact with the holder as shown in FIG. 2. When the exhaust valve 30 is stopped at the initial position, the exhaust valve 30 is separated from an end face 77 of the head cap 27. Namely, the exhaust valve 30 opens the passage 29, and the piston upper chamber 32 and the outside of the housing 11 are connected to each other. Therefore, the piston upper chamber 32 is connected to the outside B1 via the exhaust passage 28. The pressure of the piston upper chamber 32 is substantially the same as the atmospheric pressure.

Further, the control chamber 50 is connected to the outside B1 of the housing 11 via the passage 51 and the exhaust passage 65. Therefore, the cylinder 22 is pressed to the valve seat 31 by the pressure of the control chamber 49 and the biasing force of the spring 41, and the passage 42 is closed. Therefore, the compressed air in the accumulator chamber 23 is not supplied to the piston upper chamber 32, and the striking unit 13 is stopped at the top dead center. When the striking unit 13 is stopped at top dead center, the piston 33 is in contact with the valve seat 31. The piston lower chamber 35 is connected to the outside B1 via the shaft hole 40, and the pressure of the piston lower chamber 35 is substantially atmospheric pressure.

When the worker applies an operation force to the trigger 14, the trigger 14 operates counterclockwise in FIG. 3, and the trigger 14 stops at the operating position shown in FIG. 5. Then, the trigger valve 16 switches from the initial state to the operating state. Further, when the worker brings the push lever 15 into contact with the object W1 and the push lever 15 operates in the direction toward the housing 11, the push lever valve 17 switches from the initial state to the operating state.

Figure 4:
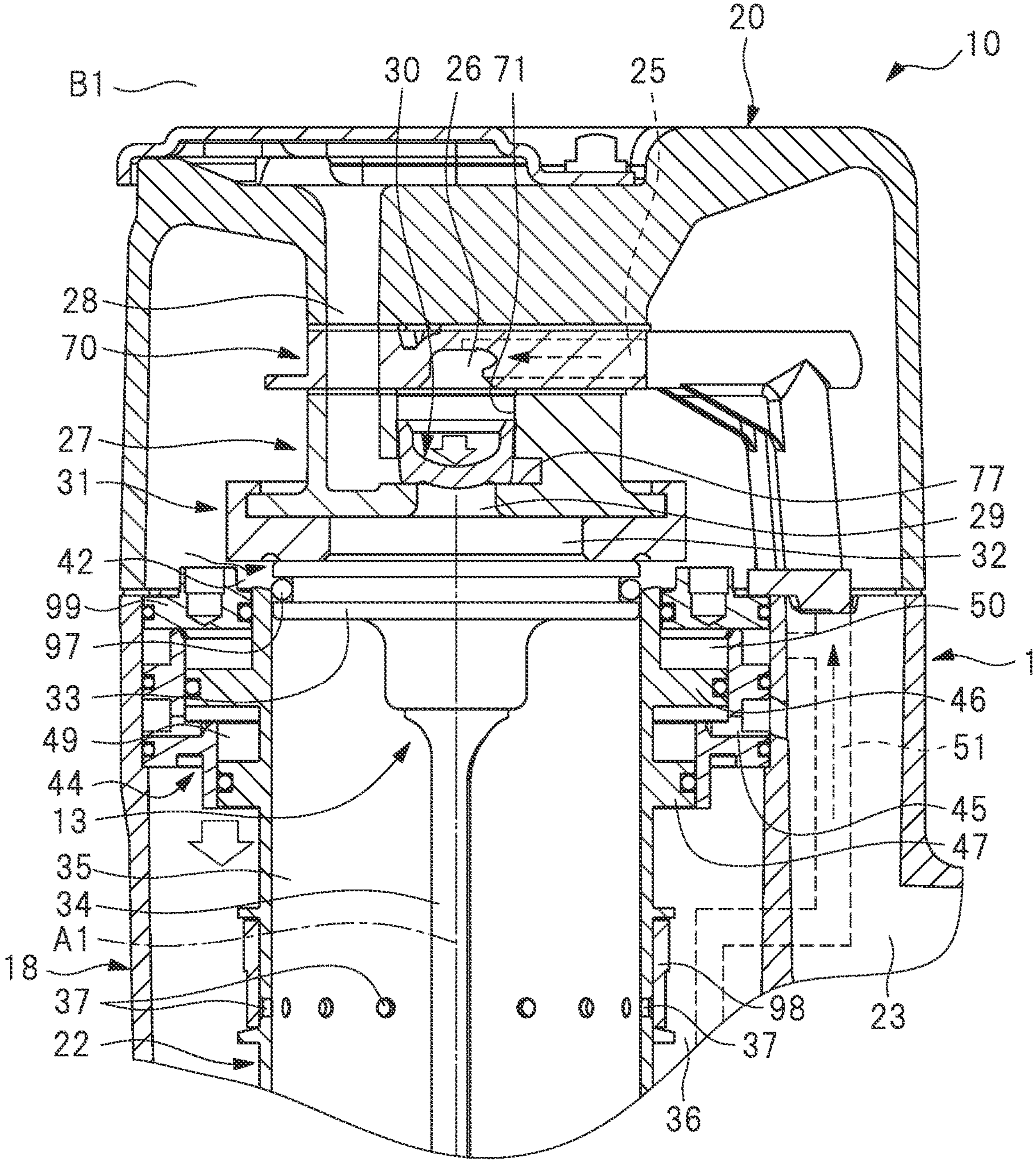
FIG. 4 is a partial cross-sectional view showing a state of the driving device in which the exhaust valve is in contact with the head cap.
Figure 6:
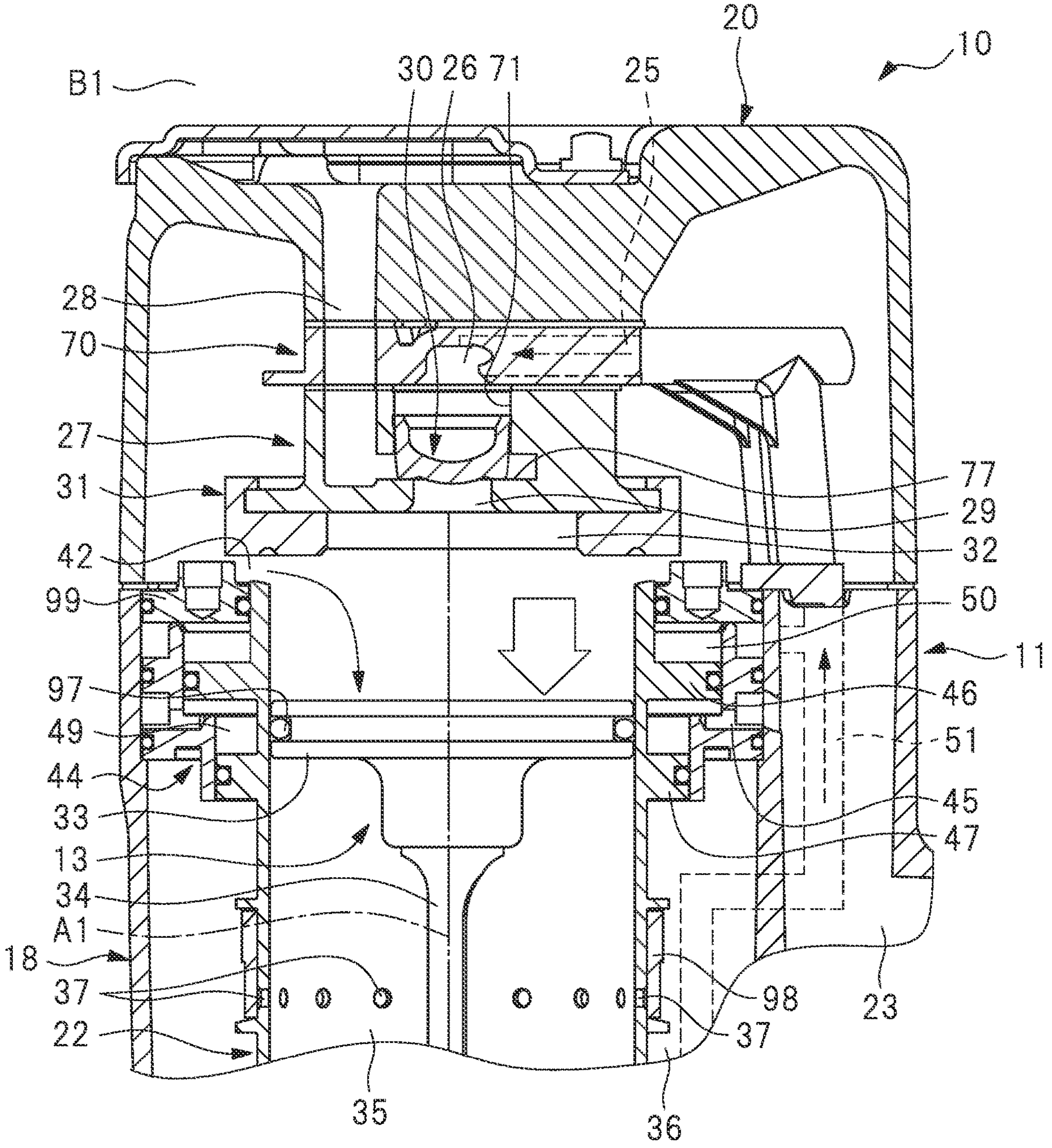
FIG. 6 is a partial cross-sectional view showing a state of the driving device in which the cylinder is separated from the stopper.

When the trigger valve 16 is in the operating state and the push lever valve 17 is in the operating state, a part of the compressed air in the accumulator chamber 23 is supplied to the exhaust valve chamber 26 through the passage 59, the pressure chamber 60, and the passages 51 and 25. Then, as shown in FIG. 4, the exhaust valve 30 operates, and the exhaust valve 30 is pressed to the end face 77 and is stopped. Namely, the exhaust valve 30 closes the passage 29, and the piston upper chamber 32 and the outside B1 are disconnected. Further, a part of the compressed air in the accumulator chamber 23 is supplied to the control chamber 50 through the passage 51. Then, the cylinder 22 operates in the direction away from the valve seat 31, and the passage 42 opens. Further, a part of the compressed air in the accumulator chamber 23 flows into the piston upper chamber 32 through the gap between the cylinder 22 and the valve seat 31, and the pressure in the piston upper chamber 32 rises. Therefore, the striking unit 13 operates from the top dead center to the bottom dead center as shown in FIG. 6, that is, descends. When the striking unit 13 descends, the driver blade 34 strikes the nail 86 in the ejection path 43, and the nail 86 is driven into the object W1.

Figure 7:
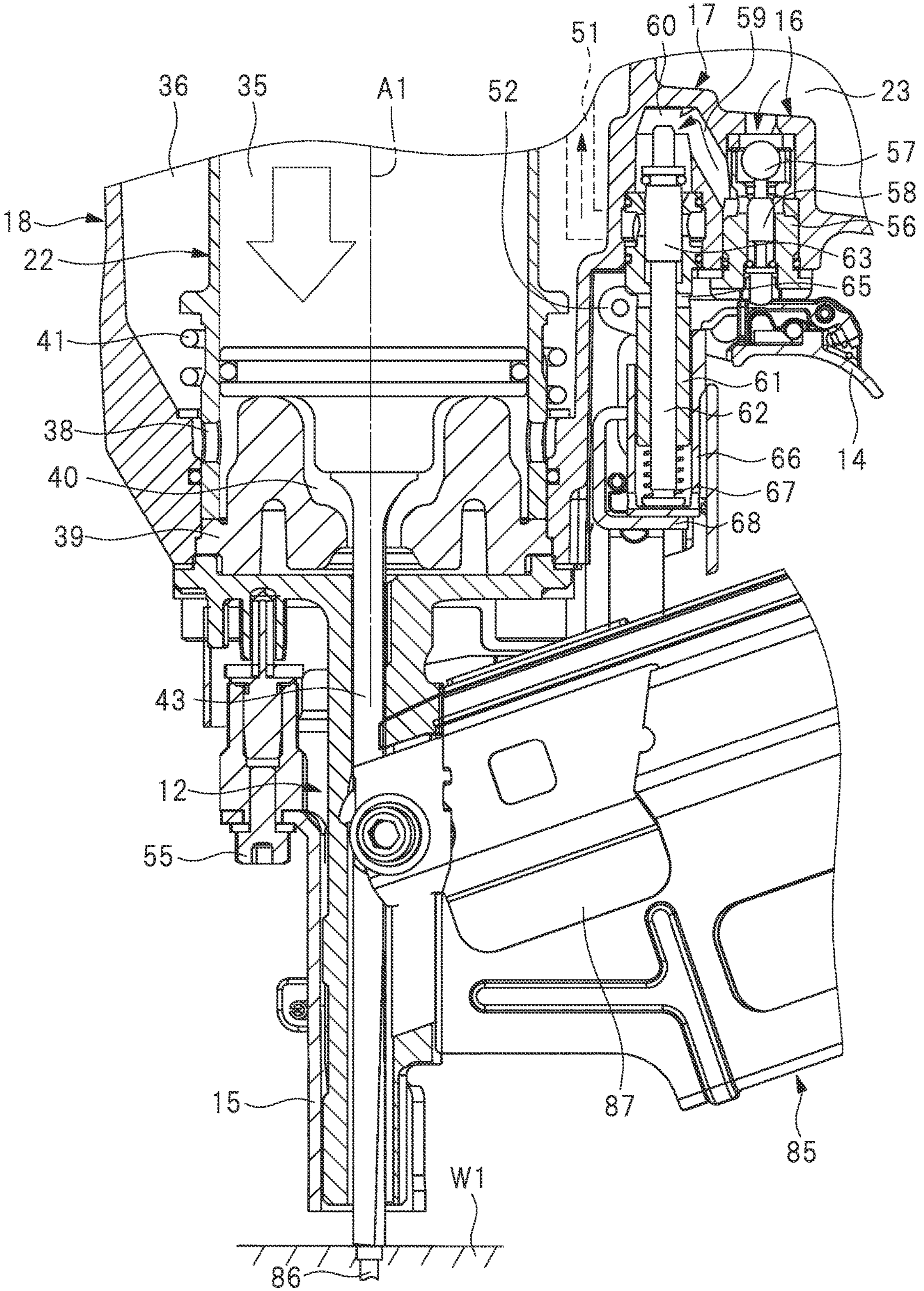
FIG. 7 is a partial cross-sectional view showing a state of the driving device in which the striking unit is located at the bottom dead center.

When the sealing member 97 moves to the position between the passage 37 and the bumper 39 while the striking unit 13 is descending, the check valve 98 operates by the pressure of the compressed air flowing into the cylinder 22 to open the passage 37. Therefore, a part of the compressed air in the cylinder 22 flows into the return air chamber 36 through the passage 37. When the striking unit 13 descends and the piston 33 collides with the bumper 39 as shown in FIG. 7, the bumper 39 absorbs a part of the kinetic energy of the striking unit 13. Further, the striking unit 13 stops at the bottom dead center. When the striking unit 13 stops at the bottom dead center, the piston 33 is pressed to the bumper 39, and the piston 33 disconnects the piston lower chamber 35 and the shaft hole 40.

Figure 9:
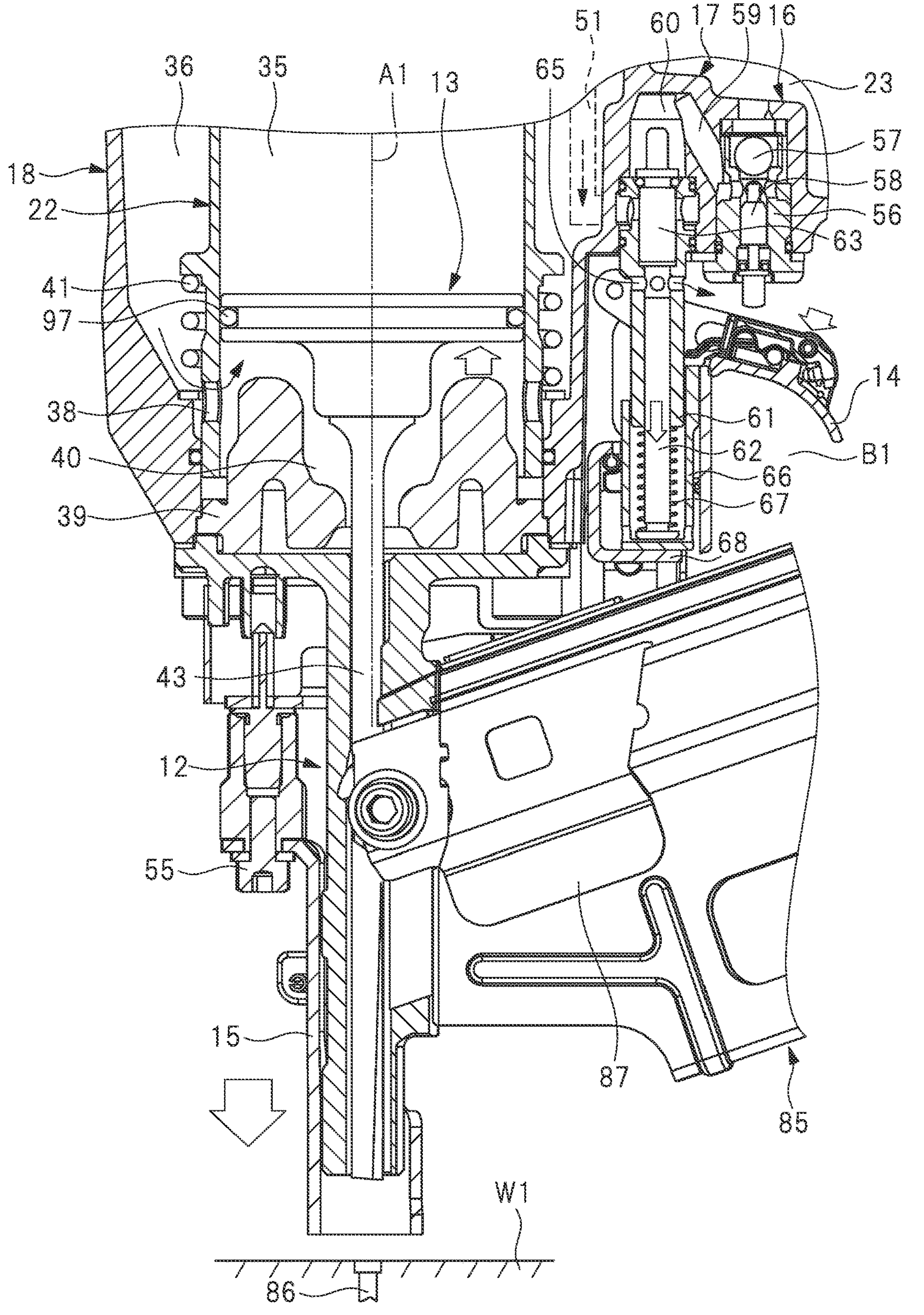
FIG. 9 is a partial cross-sectional view showing a state of the driving device in which the striking unit is operated from the bottom dead center toward the top dead center.

The push lever 15 is separated from the object W1 as shown in FIG. 9 by the reaction of the striking unit 13 driving the nail 86 into the object W1. Then, the push lever 15 operates by the biasing force of the spring and stops at the initial position. Therefore, the push lever valve 17 switches from the operating state to the initial state. Further, the worker releases the operation force on the trigger 14. Therefore, the trigger valve 16 switches from the operating state to the initial state.

Figure 8:
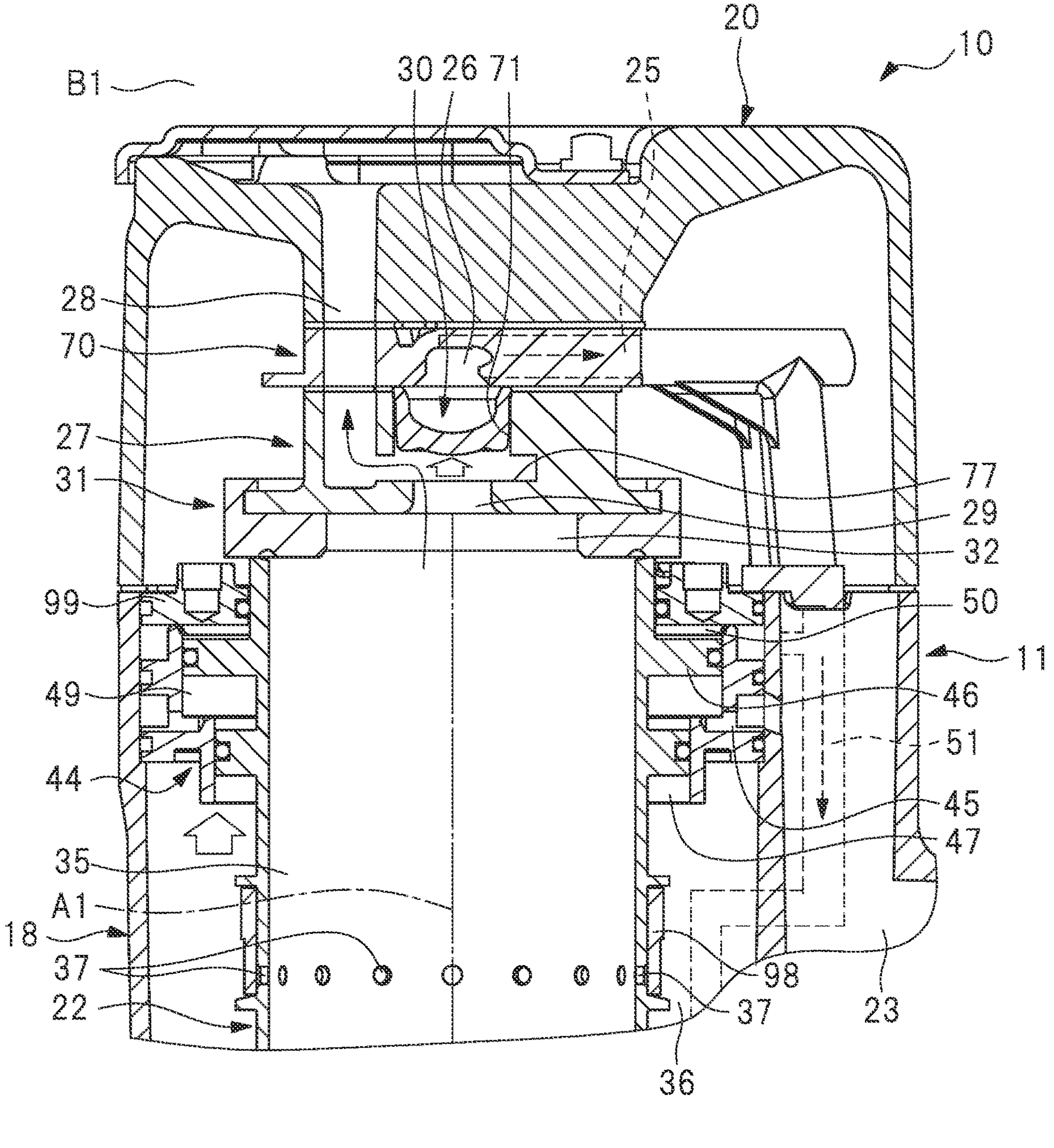
FIG. 8 is a partial cross-sectional view showing a state of the driving device in which the exhaust valve is separated from the head cap and the cylinder is in contact with the stopper.

Then, when the push lever valve 17 is in the initial state and the trigger valve 16 is in the initial state, the exhaust valve 30 operates by the pressure of the piston upper chamber 32, is separated from the end face 77, and connects the passage 29 and the exhaust passage 28. The exhaust valve 30 comes into contact with the base 70 as shown in FIG. 8 and stops at the initial position. Therefore, the compressed air in the piston upper chamber 32 is discharged to the outside B1 through the exhaust passage 28. The pressure of the piston upper chamber 32 becomes substantially atmospheric pressure.

Further, the compressed air in the control chamber 50 and the compressed air in the exhaust valve chamber 26 are discharged to the outside B1 through the passage 51 and the exhaust passage 65 as shown in FIG. 8 and FIG. 9. Therefore, the cylinder 22 operates in the direction toward the valve seat 31 as shown in FIG. 8, and stops to close the passage 42. Further, the piston 33 receives the pressure of the compressed air flowing from the return air chamber 36 through the passage 38 into the piston lower chamber 35, and the striking unit 13 operates from the bottom dead center to the top dead center as shown in FIG. 9. Then, when the piston 33 comes into contact with the valve seat 31 as shown in FIG. 1, the striking unit 13 stops at the top dead center. After the striking unit 13 stops at the top dead center, the air in the piston lower chamber 35 is discharged to the outside B1 through the shaft hole 40, and the pressure in the piston lower chamber 35 becomes substantially atmospheric pressure.

Next, a specific example of the head cap 27 and the exhaust valve 30 will be described with reference to FIG. 10(A), FIG. 10(B), and FIG. 11. The exhaust valve 30 is made of synthetic resin or synthetic rubber. As the synthetic resin, for example, a thermoplastic resin, specifically a urethane resin can be used. Urethane rubber can be used as the synthetic rubber. The exhaust valve 30 has a wall portion 78 and a tubular portion 79 connected to the wall portion 78. The exhaust valve 30 has a circular outer surface shape in a second plane intersecting the center line A1, for example, in a plane perpendicular to the center line A1 as shown in FIG. 11. The shape of the passage 29 and an opening 29A is circular. The inner diameter of the guide hole 71 is larger than the inner diameter of the opening 29A of the passage 29.

The outer diameter of the exhaust valve 30 is larger than the outer diameter of the guide hole 71. The outer peripheral surface of the exhaust valve 30 is pressed to the head cap 27 and is elastically deformed. The exhaust valve 30 can operate in the guide hole 71 in the direction along the center line A1. The exhaust valve 30 is arranged between the base 70 and the end face 77. An end portion 83 of the exhaust valve 30 in the direction along the center line A1 can be in contact with the base 70.

The exhaust valve 30 has a contact portion 80, a non-contact portion 81, and a bulge portion 82. The contact portion 80, the non-contact portion 81, and the bulge portion 82 are located opposite to the end portion 83 in the direction along the center line A1. The bulge portion 82 is provided on the wall portion 78. In the second plane intersecting the center line A1, the contact portion 80 and the non-contact portion 81 are annularly arranged about the center line A1 as the center. In the direction D1 intersecting the center line A1, for example, intersecting the center line A1 at an angle of approximately 90 degrees, that is, in the radial direction of the passage 29, the non-contact portion 81 is located on the inner side of the contact portion 80 and is located on the outer side of the bulge portion 82. The contact portion 80 and the non-contact portion 81 are arranged concentrically. As shown in FIG. 11, the contact portion 80 is arranged on the outer side of the opening 29A of the passage 29 in the second plane intersecting the center line A1. The non-contact portion 81 and the bulge portion 82 are arranged on the inner side of the opening 29A of the passage 29 in the second plane intersecting the center line A1.

Figure 10:
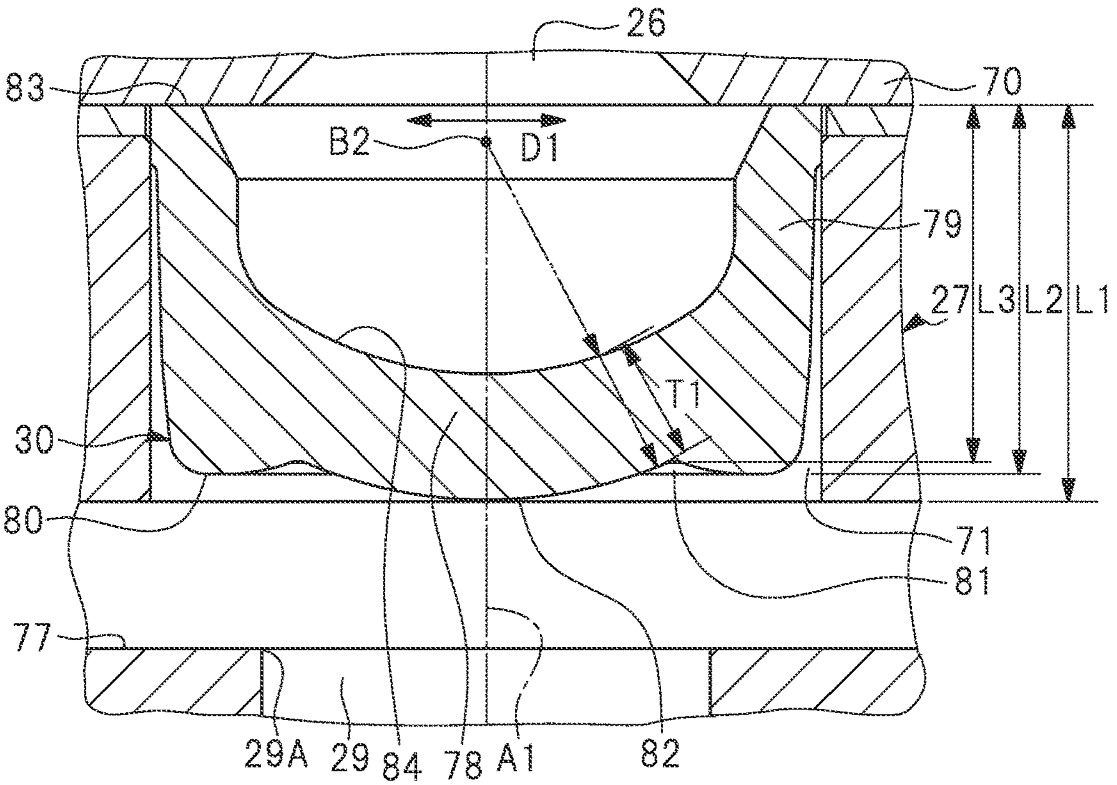
FIG. 10(A) and FIG. 10(B) are cross-sectional views showing a specific example of the exhaust valve.
Figure 10:
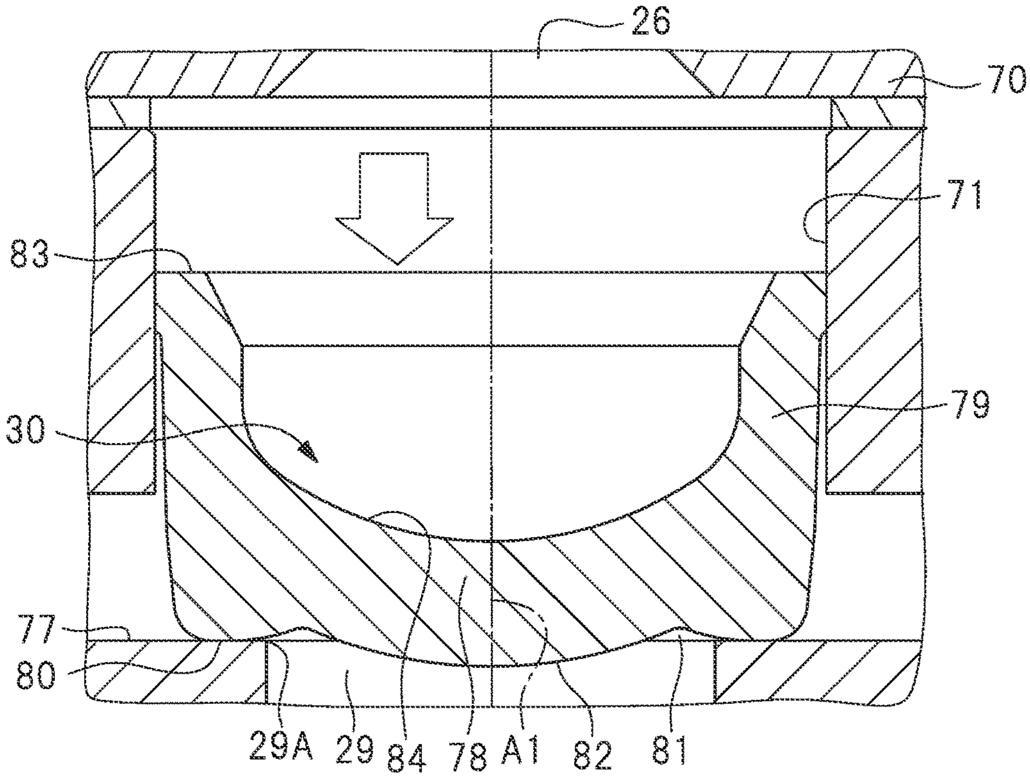
Figure 11:
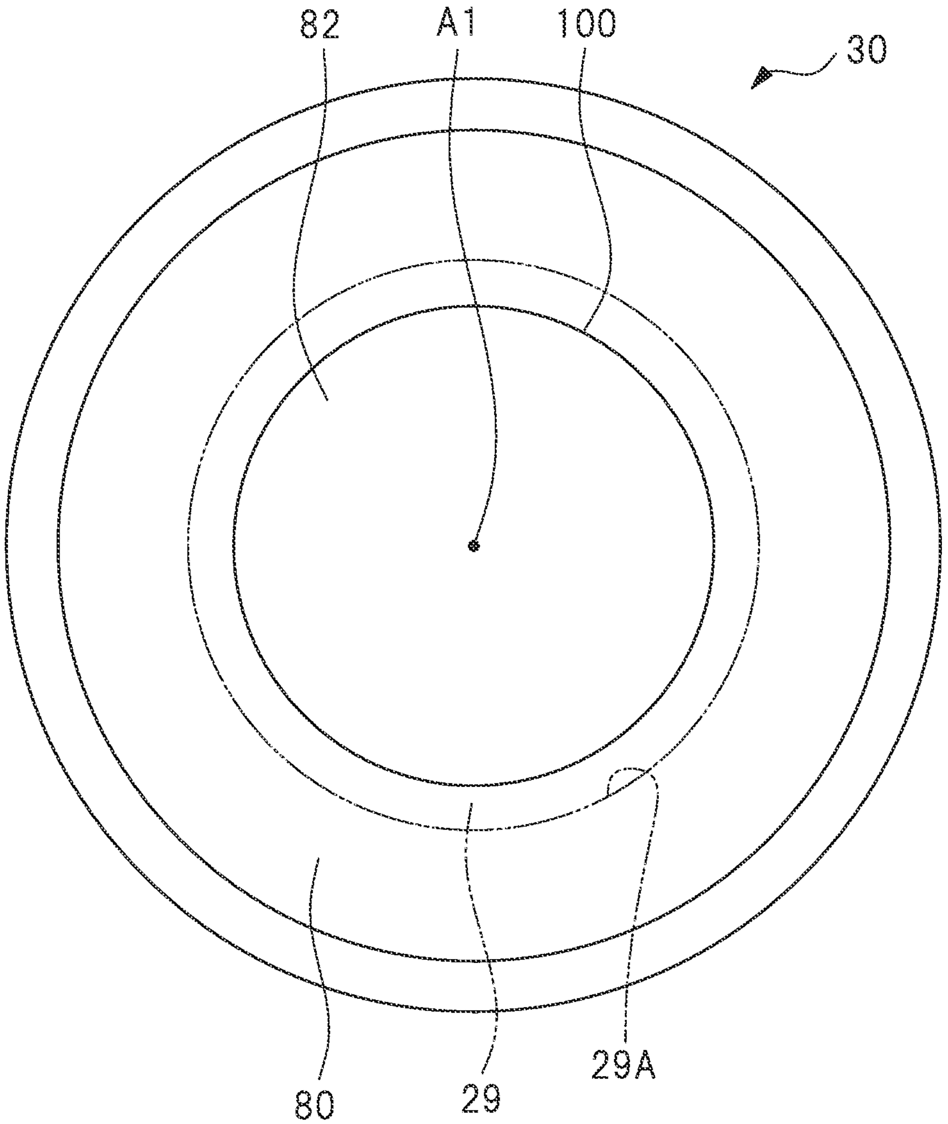
FIG. 11 is a bottom view of the exhaust valve shown in FIG. 10(A) and FIG. 10(B)

Further, as shown in FIG. 10(A), the length from the end portion 83 to the tip end of the bulge portion 82 in the direction along the center line A1 is the length L1. The length from the end portion 83 to the tip end of the contact portion 80 in the direction along the center line A1 is the length L2. The length from the end portion 83 to the non-contact portion 81 in the direction along the center line A1 is the length L3. The length L2 is smaller than the length L1 and larger than the length L3. Namely, the non-contact portion 81 is a concave portion or a recess arranged between the contact portion 80 and the bulge portion 82. The bulge portion 82 projects from the non-contact portion 81 toward the passage 29 in the first plane along the center line A1.

The exhaust valve 30 airtightly separates the exhaust valve chamber 26 from the exhaust passage 28 regardless of the position in the direction along the center line A1. Further, the exhaust valve 30 can come into and out of contact with the end face 77, and has a function of connecting and disconnecting the passage 29 and the exhaust passage 28. As shown in FIG. 10(A), when the contact portion 80 of the exhaust valve 30 is separated from the end face 77, the passage 29 and the exhaust passage 28 are connected.

Figure 12:
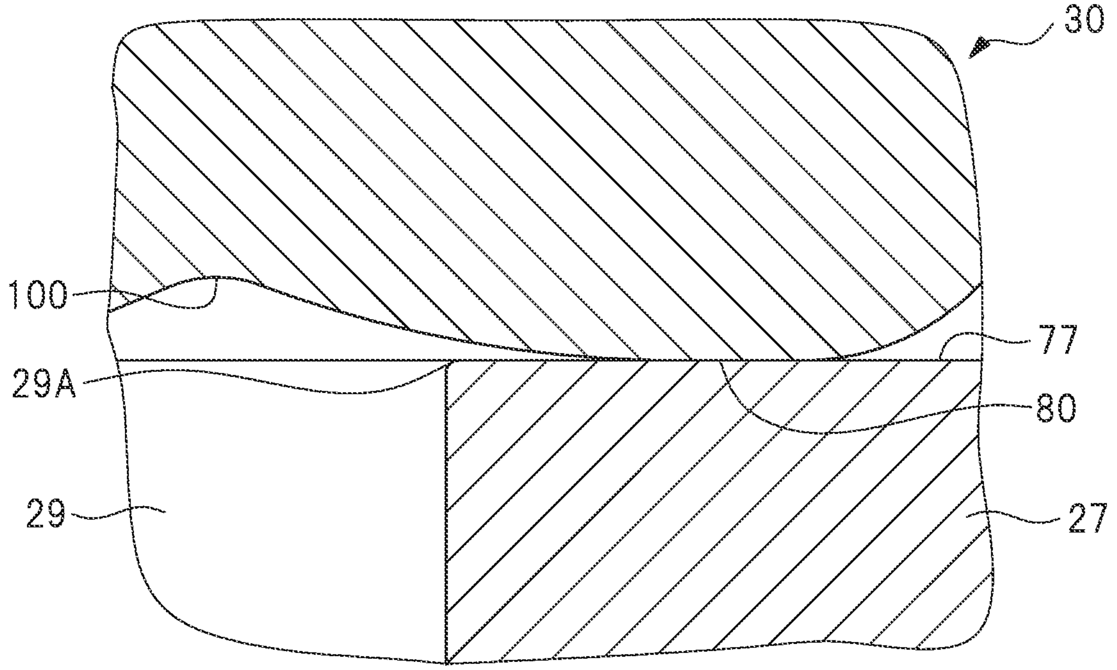
FIG. 12(A) and FIG. 12(B) are cross-sectional views showing a state of the exhaust valve shown in FIG. 10(B)
Figure 12:
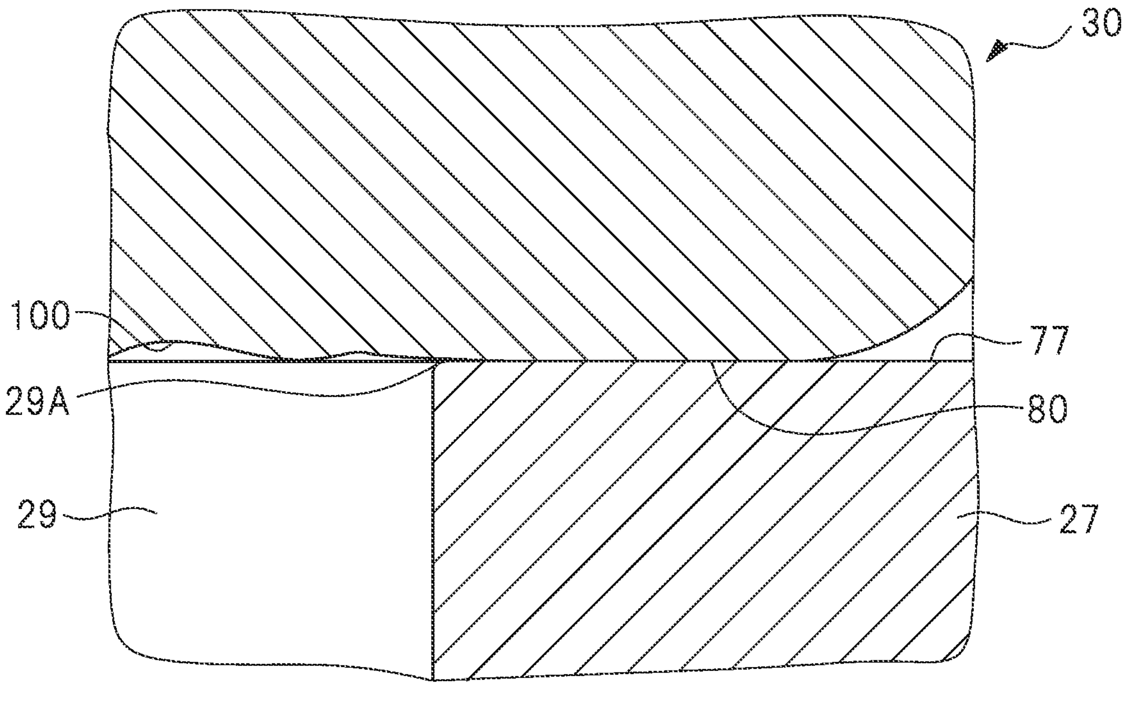

When the pressure in the exhaust valve chamber 26 rises, the exhaust valve 30 operates so as to approach the end face 77 by the pressure in the direction along the center line A1. Then, as shown in FIG. 10(B) and FIG. 12(A), the contact portion 80 of the exhaust valve 30 comes into contact with the end face 77. Further, when the contact portion 80 is elastically deformed, the contact portion 80 comes into close contact with the end face 77 and the passage 29 and the exhaust passage 28 are disconnected as shown in FIG. 12(B).

From the time when the contact portion 80 comes into contact with the end face 77 until the contact portion 80 is elastically deformed to be in close contact with the end face 77, the portion of the exhaust valve 30 on the inner side of the contact portion 80 in the radial direction about the center line A1 as the center is separated from the end face 77 of the head cap 27. Namely, there is a gap in the direction along the center line A1 between the exhaust valve 30 and the end face 77. Also, even if the contact portion 80 is elastically deformed to be in close contact with the end face 77 and the non-contact portion 81 is elastically deformed, so that the non-contact portion 81 and the contact portion 80 form a substantially linear shape, the non-contact portion 81 is located in the opening 29A and does not come into contact with the end face 77. Namely, it is possible to prevent the surface of the exhaust valve 30 from being pressed to the edge of the head cap 27 forming the opening 29A.

Therefore, it is possible to prevent the stress from concentrating at the portion of the exhaust valve 30 corresponding to the edge of the head cap 27. Therefore, even if the operation in which the exhaust valve 30 comes into and out of contact with the head cap 27 is repeated, it is possible to suppress the decrease in the strength of the exhaust valve 30. In other words, the life of the exhaust valve 30 becomes relatively long. Further, the deterioration of the function of disconnecting the passage 29 and the exhaust passage 28 by the exhaust valve 30, that is, the deterioration of the sealing property can be suppressed. In addition, a low-strength material can be used as the material of the exhaust valve 30, and the manufacturing cost of the exhaust valve 30 can be reduced as compared with the case where a high-strength material is used as the material of the exhaust valve 30.

Further, the opening 29A is chamfered so as to remove the corner in the second plane along the center line A1. The chamfered portion may be, for example, a chamfer curved in an arc shape or a linear chamfer. The chamfer curved in an arc shape is referred to as "R chamfer". The linear chamfer is referred to as "C chamfer". In this way, it is possible to more reliably avoid the concentration of stress at the portion of the exhaust valve 30 corresponding to the edge of the head cap 27.

Further, as shown in FIG. 10(A), a part of an inner surface 84 of the wall portion 78 and the surface of the bulge portion 82 are spherical surfaces centered at the point B2. The point B2 is located on the center line A1. Then, in the radial direction of the virtual circle centered at the point B2, the thickness T1 of the wall portion 78 is constant at any position in the circumferential direction of the virtual circle centered at the point B2. Therefore, the exhaust valve 30 that receives the pressure of the exhaust valve chamber 26 has the uniform elastic deformation amount, and it is possible to more reliably avoid the concentration of stress in the exhaust valve 30.

Figure 13:
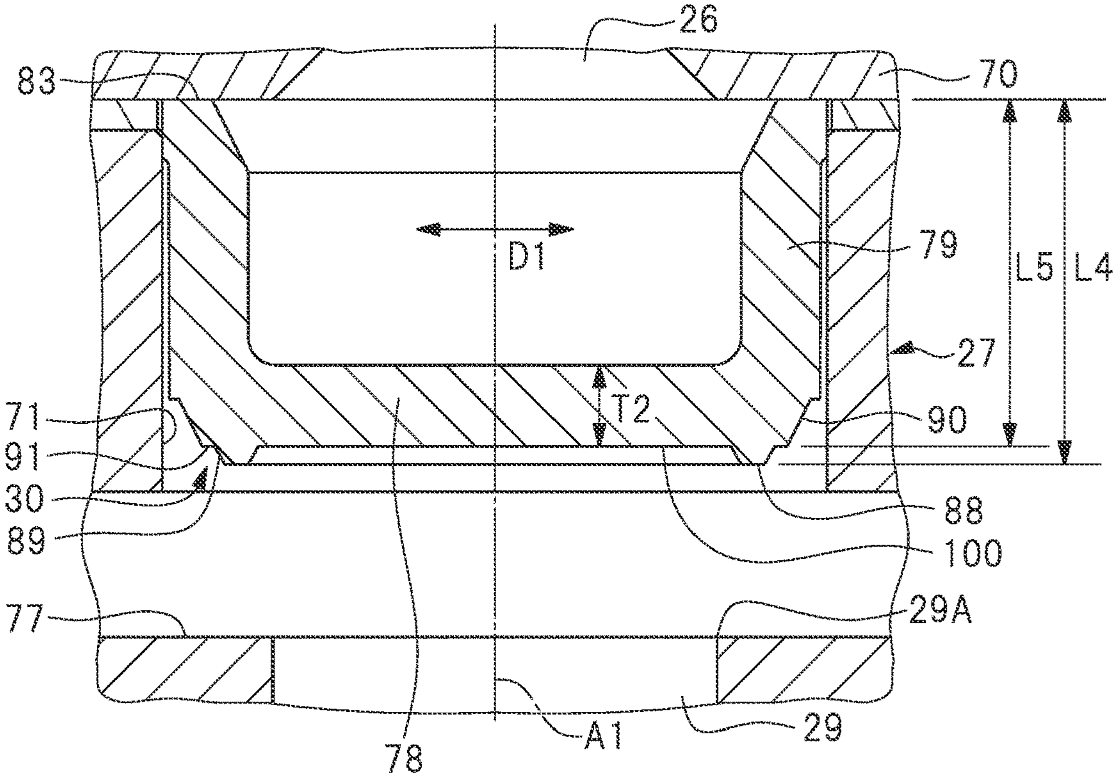
FIG. 13(A) and FIG. 13(B) are cross-sectional views showing another specific example of the exhaust valve.
Figure 13:
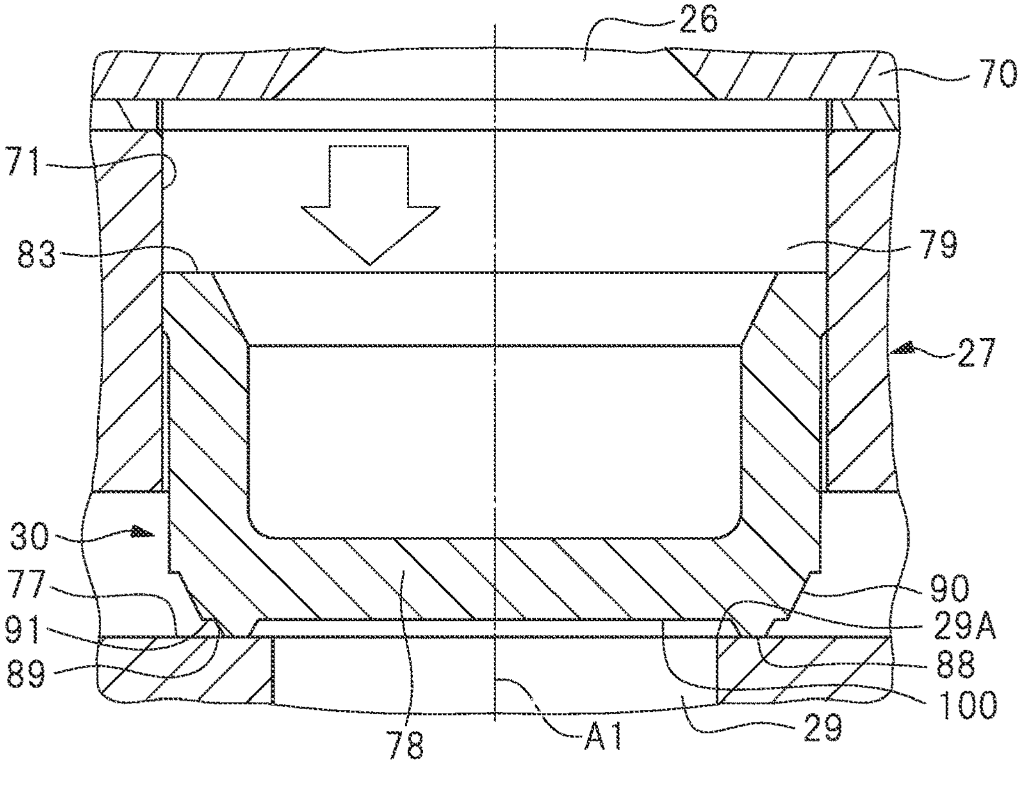
Figure 14:
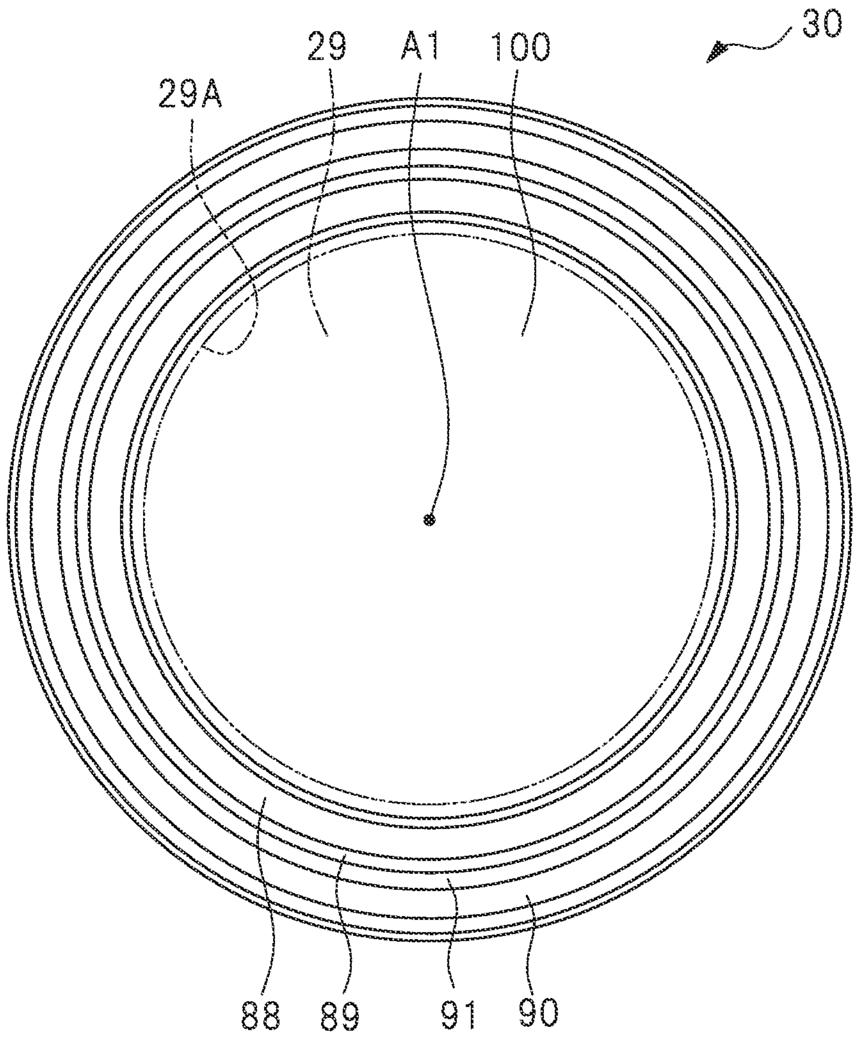
FIG. 14 is a bottom view of the exhaust valve shown in FIG. 13(A) and FIG. 13(B)

Next, another specific example of the head cap 27 and the exhaust valve 30 will be described with reference to FIG. 13(A) and FIG. 13(B). The exhaust valve 30 has a contact portion 88 and a non-contact portion 100. As shown in FIG. 14, in the second plane intersecting the center line A1, the contact portion 88 is annularly arranged about the center line A1 as the center. The non-contact portion 100 is arranged on the inner side of the contact portion 88 in the second plane intersecting the center line A1. The outer peripheral shape of the non-contact portion 100 is a circular shape centered on the center line A1. The contact portion 88 and the non-contact portion 100 are arranged concentrically. The non-contact portion 100 is a flat surface perpendicular to the center line A1. The length L4 from the end portion 83 to the tip end of the contact portion 88 is larger than the length L5 from the end portion 83 to the non-contact portion 100. Namely, the non-contact portion 100 can be defined as a concave portion or a recess arranged on the inner side of the contact portion 88 in the radial direction about the center line A1 as the center.

A tapered surface 89 is provided on the outer side of the contact portion 88, and a tapered surface 90 is provided on the outer side of the tapered surface 89. Both the tapered surface 89 and the tapered surface 90 are annularly arranged about the center line A1 as the center. The tapered surface 89 and the tapered surface 90 are inclined with respect to the center line A1. The tapered surface 90 is arranged on the outer side of the tapered surface 89 in the radial direction about the center line A1 as the center, that is, in the direction D1. The tapered surface 89 and the tapered surface 90 are connected by an end face 91.

The exhaust valve 30 shown in FIG. 13(A) has a function of connecting and disconnecting the passage 29 and the exhaust passage 28. As shown in FIG. 13(A), when the contact portion 88 of the exhaust valve 30 is separated from the end face 77, the passage 29 and the exhaust passage 28 are connected.

When the pressure in the exhaust valve chamber 26 rises, the exhaust valve 30 operates so as to approach the end face 77 by the pressure in the direction along the center line A1. Then, as shown in FIG. 13(B), the contact portion 88 of the exhaust valve 30 comes into contact with the end face 77. Further, when the contact portion 88 is elastically deformed, the contact portion 88 comes into close contact with the end face 77, and the passage 29 and the exhaust passage 28 are disconnected.

From the time when the contact portion 88 comes into contact with the end face 77 until the contact portion 88 is elastically deformed to be in close contact with the end face 77, the portion of the exhaust valve 30 on the inner side of the contact portion 88 in the radial direction about the center line A1 as the center is separated from the end face 77 of the head cap 27. Namely, there is a gap in the direction along the center line A1 between the exhaust valve 30 and the end face 77. Therefore, it is possible to suppress the decrease in the strength of the exhaust valve 30 shown in FIG. 13(B), and to obtain the same effect as the exhaust valve 30 shown in FIG. 10(B).

Further, as shown in FIG. 13(A), the non-contact portion 100 is a part of the surface of the wall portion 78. Also, the wall portion 78 has the constant thickness T2 in the direction along the center line A1. Therefore, the exhaust valve 30 that receives the pressure of the exhaust valve chamber 26 has the uniform elastic deformation amount, and it is possible to more reliably avoid the concentration of stress in the exhaust valve 30.

Figure 15:
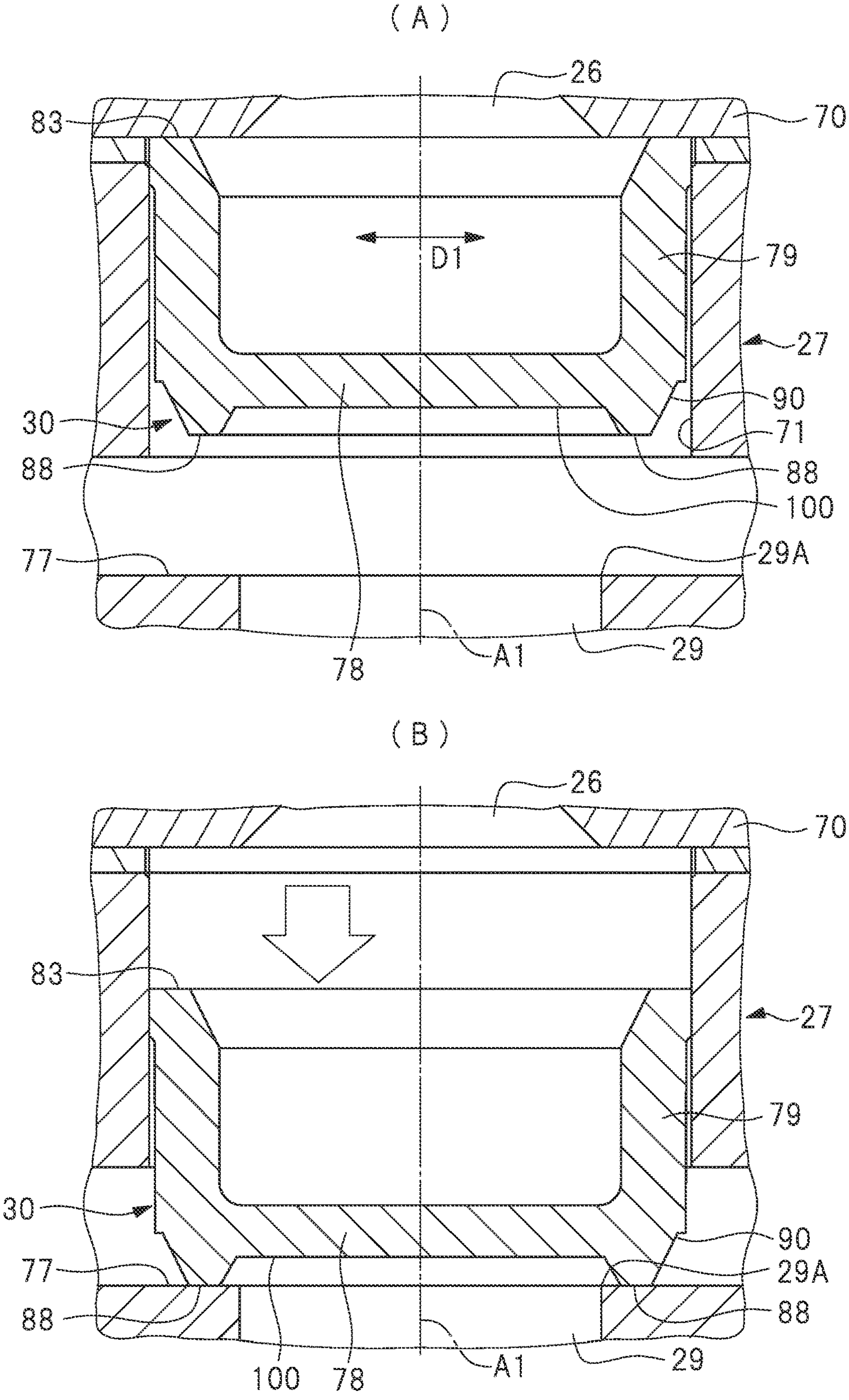
FIG. 15(A) and FIG. 15(B) are cross-sectional views showing still another specific example of the exhaust valve.

Next, another specific example of the head cap 27 and the exhaust valve 30 will be described with reference to FIG. 15(A) and FIG. 15(B). The exhaust valve 30 has a tapered surface 90 connected to the contact portion 88. The exhaust valve 30 shown in FIG. 15(A) does not have the tapered surface 89 and the end face 91 shown in FIG. 13. FIG. 15(A) shows a state in which the contact portion 88 is separated from the end face 77, and FIG. 15(B) shows a state in which the contact portion 88 is in contact with the end face 77. The exhaust valve 30 shown in FIG. 15(A) and FIG. 15(B) can obtain the same effect as the exhaust valve 30 shown in FIG. 13(A) and FIG. 13(B).

Examples of the technical meaning of the configurations described in this embodiment are as follows. The driving device 10 is an example of a driving device. The striking unit 13 is an example of a striking unit. The piston upper chamber 32 is an example of a first pressure chamber. The housing 11 is an example of a housing. The head cap 27 is an example of a valve seat. The exhaust valve 30 is an example of a valve body. The passage 29 is an example of a passage.

In FIG. 10(A), FIG. 13(A), and FIG. 15(A), the direction along the center line A1 is an example of a second direction. In FIG. 10(A), FIG. 13(A), and FIG. 15(A), the direction intersecting the center line A1, that is, the direction D1 intersecting the center line A1 at approximately 90 degrees is an example of a first direction. Each of FIG. 11 and FIG. 14 is an example of "a first plane including the first direction intersecting the second direction which is an operation direction of the valve body". Each of FIG. 10(A), FIG. 10(B), FIG. 13(A), FIG. 13(B), FIG. 15(A), and FIG. 15(B) is an example of "a second plane including the second direction along the operation direction of the valve body".

The opening 29A is an example of an opening. Each of the contact portions 80 and 88 is an example of a contact portion. Each of the non-contact portions 81 and 100 is an example of a non-contact portion. The bulge portion 82 is an example of a bulge portion. The opening 29A is an example of a curved portion. The accumulator chamber 23 is an example of an accumulator chamber. The exhaust valve chamber 26 is an example of a second pressure chamber. The trigger valve 16 and the push lever valve 17 are examples of valves. The trigger 14 is an example of a trigger. The push lever 15 is an example of a push lever. The ejection unit 12 is an example of an ejection unit. The magazine 85 is an example of a magazine. The nail 86 is an example of a fastener.

The driving device is not limited to the disclosed embodiment, and can be variously modified within the range not departing from the gist thereof. The compressible gas supplied to the accumulator chamber may be an inert gas, for example, nitrogen gas or a noble gas, instead of air. The trigger includes a lever, a button, an arm, and the like. The operation of the operating member may be either a rotational operation within a predetermined angle range or a linear reciprocating operation. The push lever may have either a shaft shape or a hollow shape. The housing may be an element referred to as a casing or body. Each of the first pressure chamber and the second pressure chamber is a space where compressed air is supplied and discharged. The passage includes a hole, a gap, and a groove through which gas can pass.

REFERENCE SIGNS LIST

10 . . . driving device, 11 . . . housing, 12 . . . ejection unit, 13 . . . striking unit, 14 . . . trigger, 15 . . . push lever, 16 . . . trigger valve, 17 . . . push lever valve, 23 . . . accumulator chamber, 26 . . . exhaust valve chamber, 26 . . . exhaust valve chamber, 27 . . . head cap, 29 . . . passage, 29A . . . opening, 30 . . . exhaust valve, 32 . . . piston upper chamber, 80, 88 . . . contact portion, 81, 100 . . . non-contact portion, 82 . . . bulge portion, 85 . . . magazine, D1 . . . direction

The invention claimed is:

1. A driving device, comprising:
a housing;
a striking unit arranged in the housing;
a first pressure chamber arranged in the housing and configured to operate the striking unit by gas pressure;
a valve seat fixed in the housing;
a passage connecting the first pressure chamber and outside of the housing through the valve seat that has an opening for the passage; and
a valve body operably provided in the housing and arranged outside the first pressure chamber, and configured to open and close the opening of the passage by coming into and out of contact with the valve seat,
wherein the valve body includes a contact portion and a non-contact portion,
wherein the valve seat has a first area including an edge of the opening, and has a second area other than the first area,
wherein the valve body opens and closes the opening of the passage,
wherein when the valve body closes the opening of the passage, the contact portion overlaps with the second area, and
wherein the non-contact portion comprises a depression away from the opening, and when the valve body closes the opening of the passage, the non-contact portion overlaps with the first area of the valve seat.

2. The driving device according to claim 1, wherein the contact portion and the non-contact portion are annularly arranged and are provided concentrically with each other.

3. The driving device according to claim 1,
wherein the non-contact portion further comprises a bulge portion surrounded by the depression, and
wherein the bulge portion projects toward the first pressure chamber in an axial direction of the passage.

4. The driving device according to claim 1, wherein the non-contact portion includes a flat surface intersecting a moving direction of the valve body to close and open the opening of the valve seat.

5. The driving device according to claim 1, wherein an internal thickness of the non-contact portion of the valve body is constant.

6. The driving device according to claim 1, wherein the passage in the valve seat is curved toward first pressure chamber.

7. The driving device according to claim 1, wherein the valve body is made of synthetic resin or synthetic rubber.

8. The driving device according to claim 7, wherein, when the contact portion is pressed to the valve seat, the valve body is elastically deformed such that the contact portion and the non-contact portion lie flush with each other.

9. The driving device according to claim 1, further comprising:

an accumulator chamber provided in the housing and configured to store a gas;

a second pressure chamber to which the gas is supplied from the accumulator chamber and which is configured to operate the valve body to approach the valve seat by pressure of the gas;

a valve configured to switch between an initial state in which the second pressure chamber is connected to the outside of the housing and the second pressure chamber is disconnected from the accumulator chamber and an operating state in which the second pressure chamber is connected to the accumulator chamber and the second pressure chamber is disconnected from the outside of the housing;

a trigger which is provided on the housing and to which an operation force is applied and released;

a push lever provided on the housing and configured to come into and out of contact with an object into which a fastener struck by the striking unit is driven;

an ejection unit provided on the housing and configured to guide the striking unit; and a magazine which contains the fastener to be supplied to the ejection unit, wherein the valve is in the initial state when the operation force to the trigger is released or the push lever is separated from the object, and wherein the valve is in the operating state when the operation force is applied to the trigger and the push lever is in contact with the object.

10. A driving device, comprising:

a housing;

a striking unit arranged in the housing;

a first pressure chamber arranged in the housing and configured to operate the striking unit by gas pressure;

a valve seat fixed in the housing;

a passage connecting the first pressure chamber and outside of the housing through the valve seat that has an opening for the passage, wherein the valve seat has a first area includes an edge of the opening, and has a second area other than the first area; and a valve body operably provided in the housing and arranged outside the first pressure chamber, and configured to open and close the opening of the passage, wherein the valve body comprises:

a contact portion positioned to overlap with the second area of the valve seat when the valve body closes the opening of the passage; and a depression portion recessed away from the opening of the valve seat and positioned to overlap with the first area of the valve seat when the valve body closes the opening of the passage.

11. The driving device according to claim 10, wherein the contact portion and the depression portion are annularly arranged and are arranged concentrically with each other.

12. The driving device according to claim 10, wherein the valve body further comprises a bulge portion surrounded by the depression portion, and wherein the bulge portion projects toward the first pressure chamber in an axial direction of the passage.

* * * * *